H. O'B. HARDING.
CONVEYER DEVICE FOR LOADING FLOUR INTO CARS.
APPLICATION FILED FEB. 14, 1919.
1,373,659.
Patented Apr. 5, 1921.
4 SHEETS—SHEET 1.
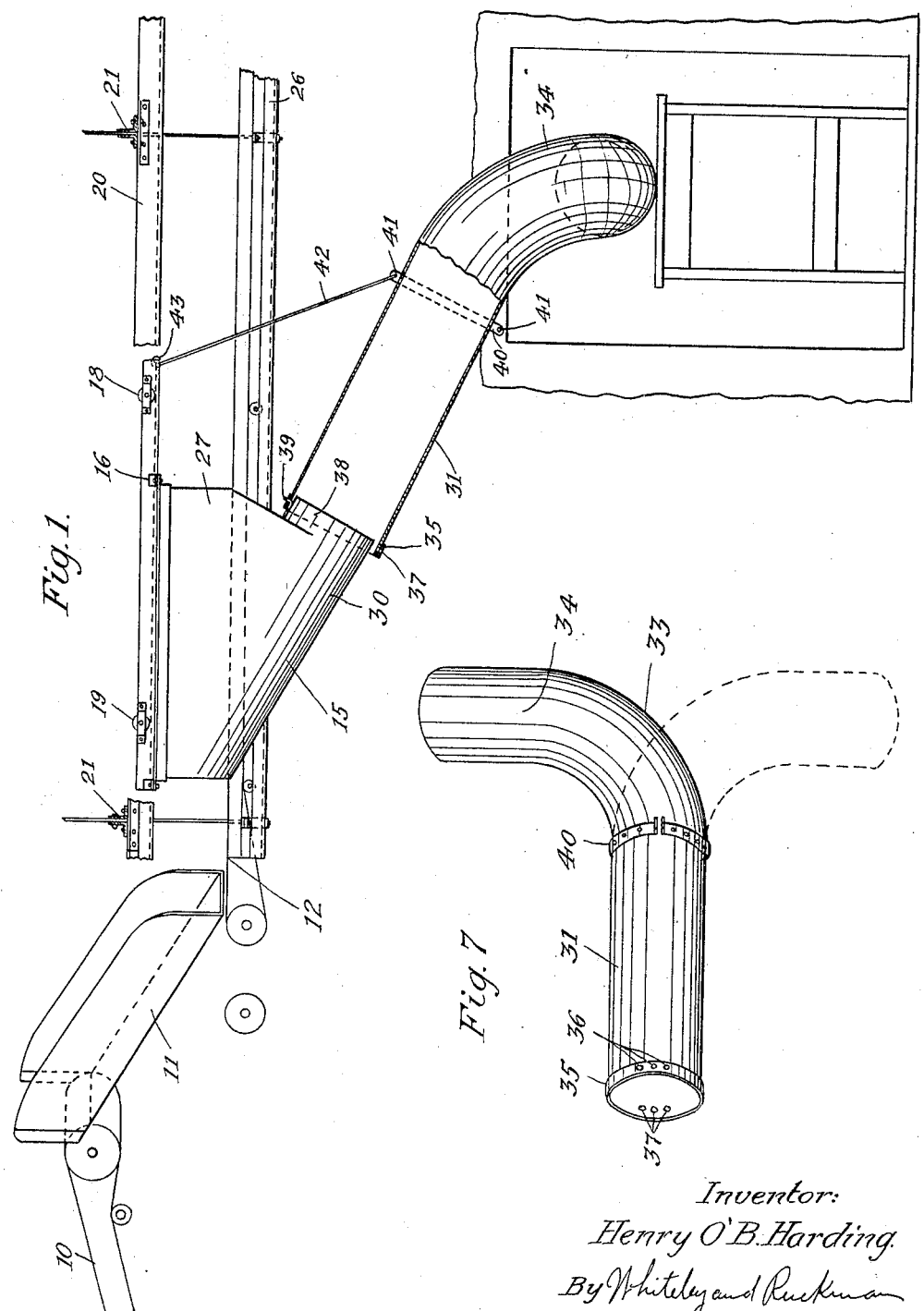
Inventor:
Henry O'B. Harding.
By Whiteley and Ruckman
his Attorneys

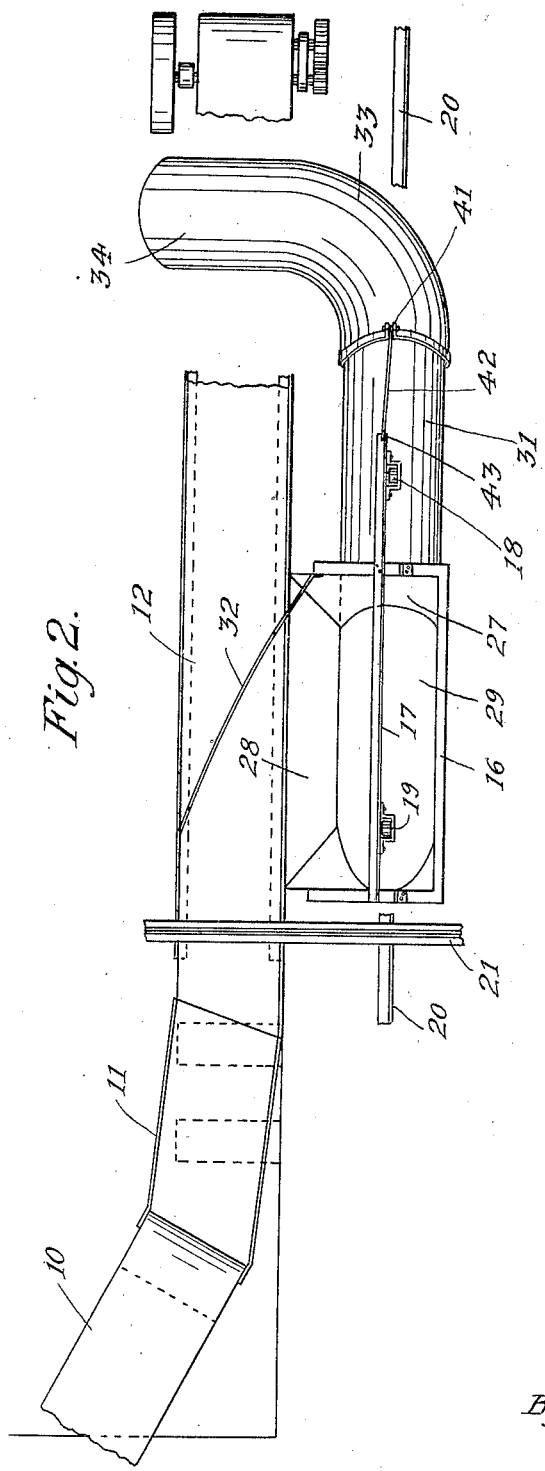

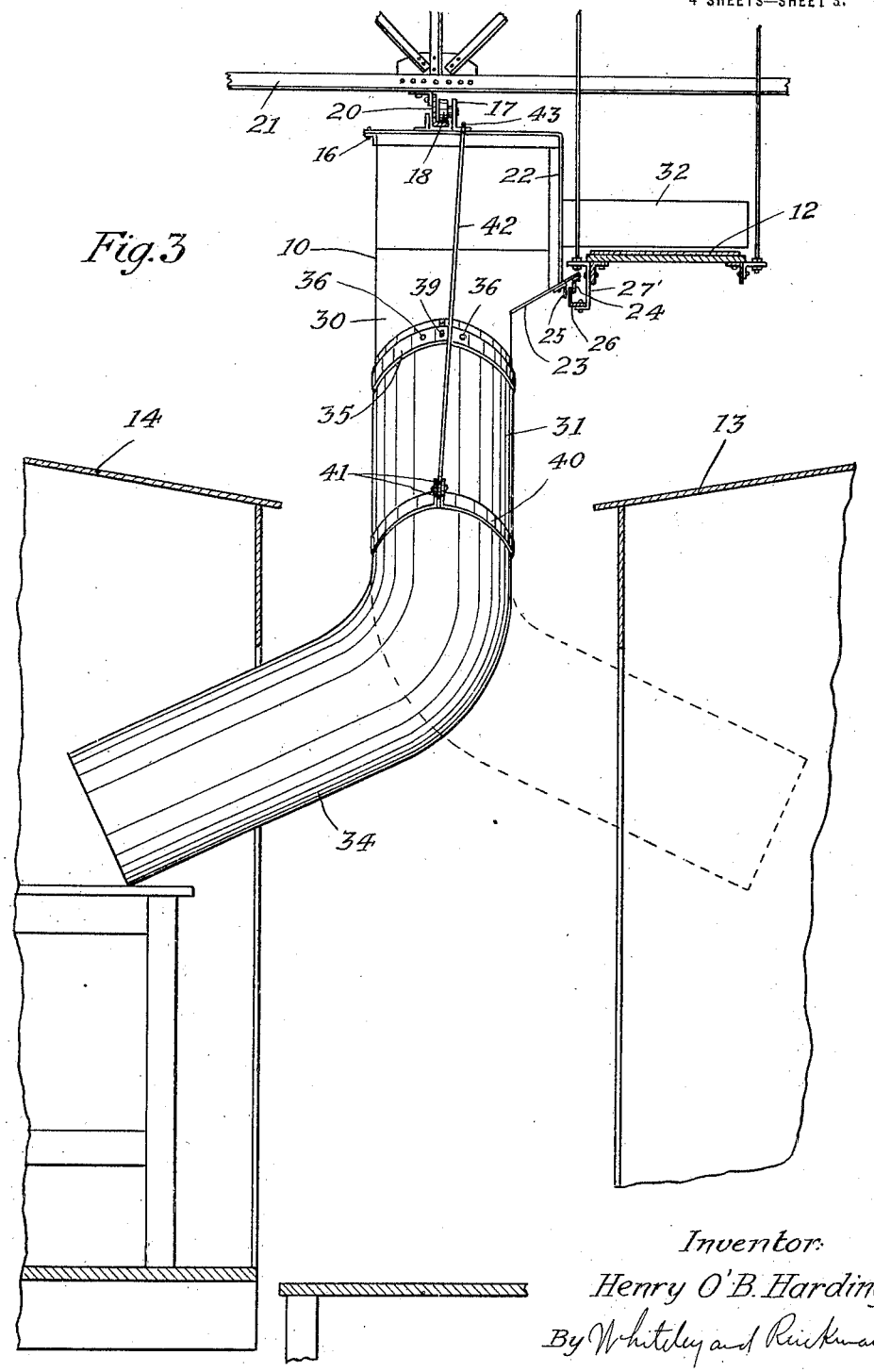

H. O'B. HARDING.
CONVEYER DEVICE FOR LOADING FLOUR INTO CARS.
APPLICATION FILED FEB. 14, 1919.
1,373,659.
Patented Apr. 5, 1921.
4 SHEETS—SHEET 4.
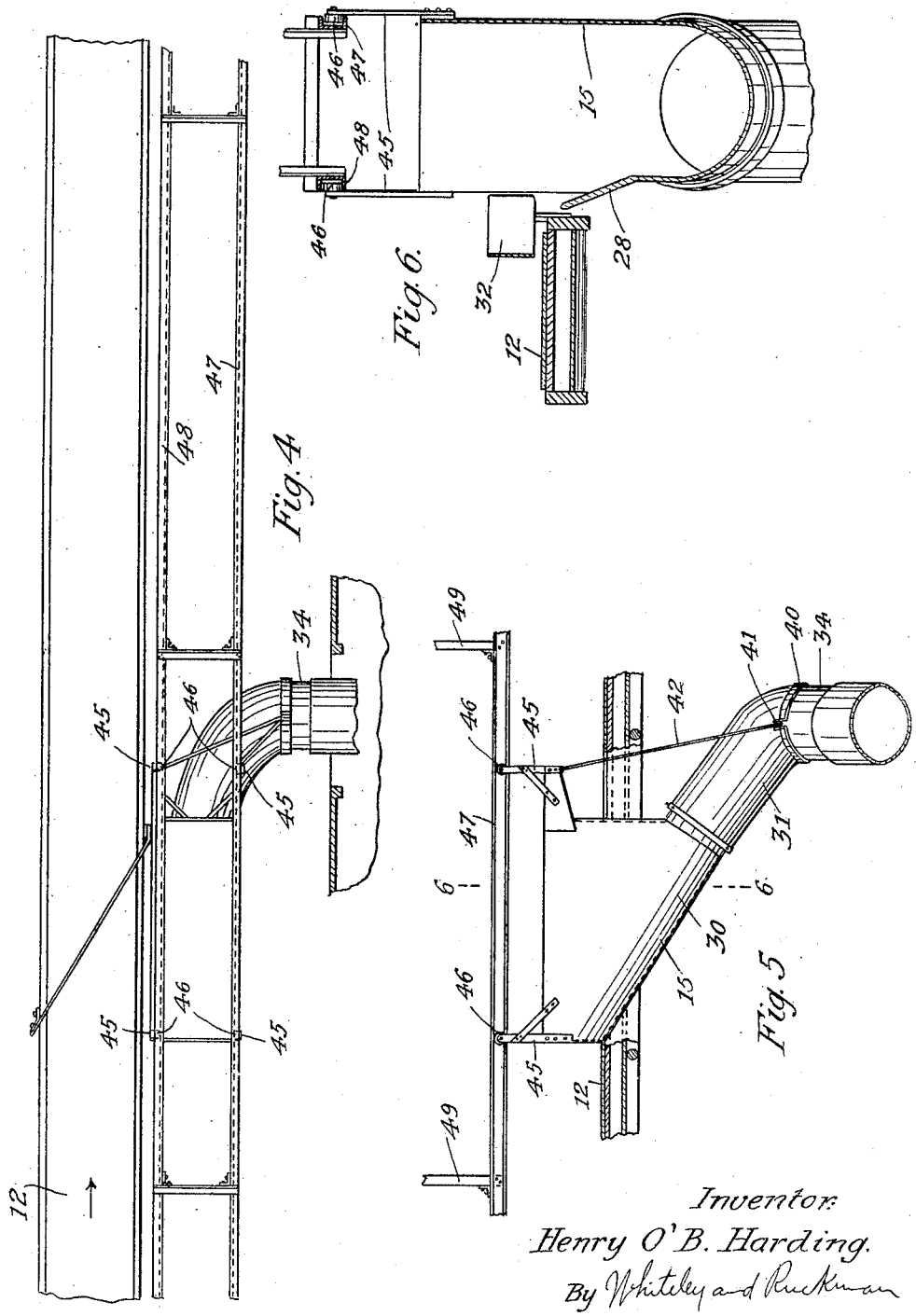
Inventor:
Henry O'B. Harding.
By Whiteley and Ruckman
his Attorneys

UNITED STATES PATENT OFFICE.

HENRY O'B. HARDING, OF MINNEAPOLIS, MINNESOTA.

CONVEYER DEVICE FOR LOADING FLOUR INTO CARS.

1,373,659. Specification of Letters Patent. Patented Apr. 5, 1921.

Application filed February 14, 1919. Serial No. 276,910.

*To all whom it may concern:*

Be it known that I, HENRY O'B. HARDING, a citizen of the United States, residing at Minneapolis, in the county of Hennepin and State of Minnesota, have invented certain new and useful Improvements in Conveyer Devices for Loading Flour Into Cars, of which the following is a specification.

My invention relates to conveyer devices for loading flour into cars and has for its object to provide mechanism adapted to receive sacks of flour from a single conveyer and deposit said sacks in any one of a number of cars positioned on either of two tracks adjacent said conveyer.

The full objects and advantages of my invention will appear in connection with the detailed description thereof and are particularly pointed out in the claims.

In the drawings, illustrating the application of my invention in one form,—

Figure 1 is an elevation view of the conveyer system with some parts in section and broken away. Fig. 2 is a plan view of parts shown in Fig. 1 with certain elements removed or broken away. Fig. 3 is an end elevation of the parts shown in Fig. 1 with the loading chute shown in one position in full lines and in the other of its operative positions in dotted lines. Fig. 4 is a plan view of loading mechanism showing a different form of support for the movable carrier. Fig. 5 is a side elevation view of the construction shown in Fig. 4. Fig. 6 is a section on line 6—6 of Fig. 5. Fig. 7 is a detail view of the spout chute leading from the carrier.

As illustrated, particularly in Fig. 1, flour is brought in sacks on conveyer 10 from the mill. From conveyer 10 the sacks pass upon and down a chute 11 which discharges upon a constantly-running conveyer 12, being above a pair of railroad tracks upon which are cars 13 and 14. The conveyer 12 is positioned at one side of the central area between said cars for a purpose hereinafter to be pointed out. As shown in Figs. 1, 2 and 3, a traveling carrier 15 is provided with a top framework 16 having a central bar 17 upon which are rollers 18 and 19 engaging the horizontal portion of an angle bar 20, the angle bar 20 being suspended from any suitable framework 21. The frame 16 has a dependent portion 22 to which is secured a bar 23 having lips 24, 25 engaging on either side of the vertical portion of an angle bar 26 which is secured by hangers 27' to the frame of conveyer 12. The members 24 and 25 in coöperation with the angle iron 26 prevent tipping of the carrier and hold it central over the space between the cars 13 and 14. To the frame 16 is secured a hopper extension 27 formed of sloping walls and discharging into an oval mouth 29 of a downwardly-turned extension 30 which discharges into a spout chute 31. The sloping wall 28 adjacent the carrier 12 comes to a point slightly below the edge of said carrier as shown in Fig. 2. Sacks moving on the conveyer 12 are brought into engagement with a shifting board 32 which throws them off from conveyer 12 from which they pass down the sloping wall 28, through the opening 29 and into the extension 30 and the carrier spout 31. This carrier pipe, shown in detail in Fig. 7, comprises a main portion, an elbow 33 and an extension 34 turned at an angle to the main portion. A collar 35 is fast on the end of spout 31. This collar comprises two sets of holes 36 and 37 at diametrically-opposite sides of the collar 35. The spout 31 is of larger diameter than the diameter of a cylindrical extension 38 from the member 30. Upon 38 are right-angled hooks 39 which engage within the holes 36 or the holes 37 by means of which the angular extension 34 of spout 31 is directed either to the left, as shown in full lines in Fig. 3, or to the right as shown in dotted lines, to pass through the door openings of either car upon the two tracks below the conveyer system. A collar 40 is secured to the spout 31 and has ears 41 located on each side which are apertured and receive the hook of a link member 42 which, in turn, is secured to the bar 17 as indicated at 43.

It will thus be seen that the spout 31 may readily be adjusted and held in adjusted position to deliver either to the right or left in either car 13 or 14. It is absolutely immaterial about how the cars are "spotted" or set in alongside of the conveyer, as the carrier member 10 can be readily rolled along to bring the spout extension 34 into proper position within the doorway of a car. Moreover, the construction may, if desired, be lengthened out so as to be used above a row of cars on each track, the same conveyer 12 carrying the flour to each of said cars.

The modification illustrated in Figs. 4, 5 and 6 is substantially the same as that above described except that the carrier 15 is supported somewhat differently for longitudinal movement along the conveyer belt 12. As shown in Figs. 4, 5 and 6, four hangers 45 are applied to the upper part of the carrier 15. Each of said hangers is provided with a roller 46, which rollers engage inside of parallel U-bars 47 and 48, respectively, said U-bars being suspended by hangers 49 from a supporting framework. In this construction two supporting bars are employed and the use of the guide mechanism 24, 25, 26 of the construction of Fig. 3 is thereby obviated. In all other respects there is no difference between the two forms of the construction.

The advantages of the system are very obvious and have been fairly indicated in the description heretofore given. Filled sacks are conveyed from the mill and deposited upon the constantly-moving conveyer 12. Cars are run in and out on both tracks below the conveyer and as fast as one car is filled the carrier 15 is moved along into the proper position for the spout extension 34 to enter another car wherever that car may be positioned. The loading device is therefore always adapted to be accurately placed in reference to the cars to be loaded, which can be moved in and out and left in any position without in the slightest affecting the convenience and accuracy of the loading mechanism. This is particularly important because it is a fact that ordinarily the space for loading cars at flour mills is limited. It usually happens that cars have to be pushed in and out of a switch track and the utmost inner movement will be determined by a bumper across the track, but cars vary in length very greatly and therefore the position of the door with reference to the bumper will be correspondingly and necessarily varied. The sliding carrier mechanism of my invention permits accurate accommodation to any and all variations in position of the car door.

I claim:

1. A conveyer device for loading articles such as sacks of flour into cars comprising a framework, an overhead track supported by said framework, a carriage mounted for movement along said overhead track, a driven conveyer belt mounted adjacent and parallel to said overhead track, a chute depending from said carriage and having an angularly-disposed portion adapted to enter the side doors of cars, and means for shifting articles from said conveyer belt into said chute.

2. A conveyer device for loading articles such as sacks of flour into cars comprising a framework, an overhead track supported by said framework, a carriage mounted for movement along said overhead track, a driven conveyer belt mounted adjacent and parallel to said overhead track, a chute depending from said carriage and having an angularly-disposed portion adapted to enter the side doors of cars, means for holding said chute with its angularly-disposed portion extending out from either side of said overhead tracks, and means for shifting articles from said conveyer belt into said chute.

3. A conveyer device for loading articles such as sacks of flour into cars comprising a framework, a rail supported by said framework, a carriage mounted for movement along said rail, a driven conveyer belt mounted adjacent and parallel to said rail, a guide mounted on the frame of said conveyer belt, a coöperating guide mounted on said carriage, a chute depending from said carriage and having an angularly-disposed portion adapted to enter the side doors of cars, means for holding said chute with its angularly-disposed portion extending out from either side of said rail, and means for shifting articles from said conveyer belt into said chute.

In testimony whereof I hereunto affix my signature.

HENRY O'B. HARDING.